United States Patent [19]

Pallant et al.

[11] 4,131,316
[45] Dec. 26, 1978

[54] VEHICLE SEATS

[75] Inventors: Joseph Pallant, Albrighton; John P. Johndrow, Wildwood, both of England

[73] Assignee: H. R. Turner (Willenhall) Limited, Walsall, England

[21] Appl. No.: 809,630

[22] Filed: Jun. 24, 1977

[30] Foreign Application Priority Data

Jul. 2, 1976 [GB] United Kingdom .............. 27562/76
Nov. 27, 1976 [GB] United Kingdom .............. 49594/76

[51] Int. Cl.² .............................................. A47C 1/02
[52] U.S. Cl. ...................................... 297/341; 297/367
[58] Field of Search ...................... 297/341, 366, 367

[56] References Cited

U.S. PATENT DOCUMENTS

| | | |
|---|---|---|
| 2,795,265 | 6/1957 | Albrecht ............................. 297/341 |
| 2,796,113 | 6/1957 | Lyon et al. ......................... 297/341 |
| 2,823,949 | 2/1958 | Williams et al. .................... 297/341 |
| 3,853,373 | 12/1974 | Corbett ............................... 297/341 |
| 3,931,995 | 1/1976 | Arai .................................... 297/341 |
| 3,940,182 | 2/1976 | Tamura ............................... 297/341 |
| 4,015,877 | 4/1977 | Button ................................ 297/341 |
| 4,043,593 | 8/1977 | Turner ................................ 297/341 |

*Primary Examiner*—Francis K. Zugel
*Attorney, Agent, or Firm*—Marshall & Yeasting

[57] ABSTRACT

An adjustable reclining mechanism for a vehicle seat is combined with a linkage which translates folding of the backrest into forward or rearward movement of the seat, the reclining mechanism including a rectilinearly displaceable toothed member co-operable with a pawl to hold the seat base and the backrest in selected positions of adjustment, of which the following is a specification.

7 Claims, 3 Drawing Figures

VEHICLE SEATS

This invention relates to vehicle seats and, in particular, to mechanisms for incorporation in such seats so as to enable the backrest to be adjusted in inclination relative to the seat base and/or to be folded with accompanying forward movement of the seat base.

According to one aspect of the invention we provide an adjustable reclining mechanism for a vehicle seat comprising first and second parts pivotally coupled together, an elongate member mounted on the first part and coupled to the second part in such a way as to slide lengthwise in response to relative pivoting between said parts and a locking element mounted on the first part and operable to prevent lengthwise sliding movement of said elongate member and thereby prevent relative pivoting between said parts.

In practice, said first part is attached to, or forms part of, one side of a seat base of a vehicle seat and the second part is attached to, or forms part of, the same side of the backrest, the mechanism being duplicated at the other side of the seat, both locking elements being operable by a single handle or knob located on the one side of the seat.

Other features of the invention will become apparent from the appended claims and the following description with reference to the accompanying drawings, in which:

Figure 1:
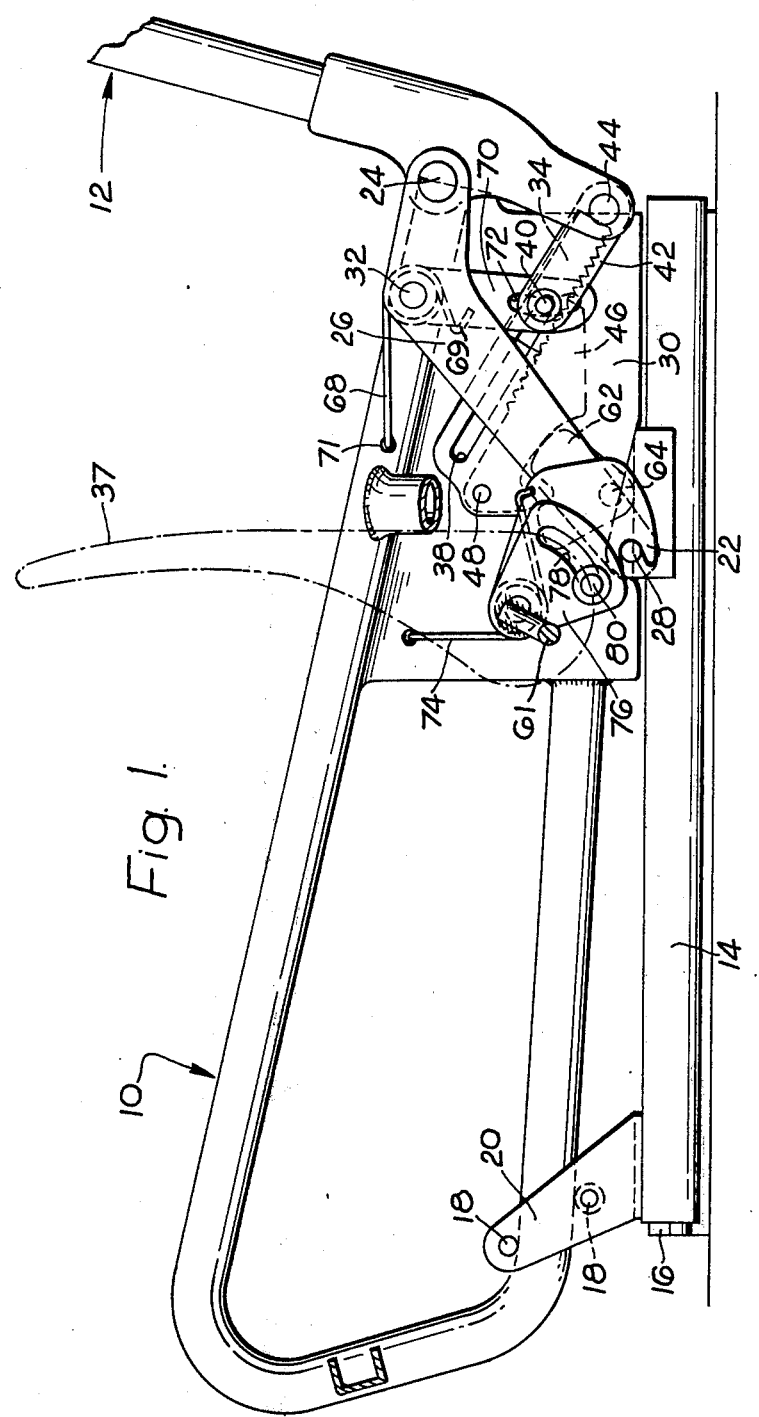
FIG. 1 is a side view of one side of a vehicle seat showing the backrest in a normal seating position.

Referring now to the accompanying drawings, only one side of the vehicle seat is illustrated but it is to be understood that, unless otherwise stated, the mechanism is duplicated at the other side of the seat. The seat comprises a seat base formed by tubular framework 10 and a backrest 12. The base is mounted on a pair of parallel slides 14 which cooperate with slideways 16 attached to the vehicle floor so that the seat can be adjusted forwardly and rearwardly to suit the occupant, means (not shown) being provided to releasably hold the slide parts in any selected position of adjustment. The seat base 10 is itself mounted slidably relative to the slides 14, its forward ends being arranged to pass between guide rollers or pins 18 carried by a bracket 20 or the like mounted on each slide 14. Releasable catches 22 are provided which normally hold the base in place relative to the slides 14.

The backrest is effectively pivoted to the base 10 at pivot 24 between the backrest and link 26 which is pivoted at its other end to the slide 14 via pivot 28 (which also acts as a keeper for the catch 22) and is pivoted intermediate its ends to the seat base via pivot 32. When each catch 22 is engaged with the respective keeper 28, the link 26 is held fixed in the angular position shown. A pair of plates 30 secured to the seat base slidably mount a toothed rack 34 which is arranged, when free, to slide forwardly or rearwardly along an inwardly directed guide formation provided on one of the plates 30. A stop 38 is formed in the outer plate 30 so as to run parallel with the guide formation and the rack 34 is pivotally connected at pivot 40, which extends through the stop 38, to a link 42 which at its other end is pivoted via pivot 44 to the backrest at a location below pivot 24. Thus, as the backrest is tilted forwardly or rearwardly from the position shown, the rack 34 is displaced rearwardly or forwardly.

To hold the backrest in a selected position of angular adjustment, a toothed member 46 is arranged to cooperate with the rack, the toothed member being pivoted at 48 and being movable into and out of mesh with the rack 34 by a cam 60, carried at each end of a spindle 61, via a cam follower 62 pivoted on the outer face 30 at 64, the cam 60 being engageable with an abutment pin 66 extending from the follower 62 through slot 63. Inclination adjustment is possible when the pawls 46 are out of mesh with the racks and this condition is obtained by rearward displacement (or clockwise turning) of a handle 37 which turns cam 60 clockwise and cam follower 62 counter-clockwise to allow the pawl 46 to withdraw from mesh. In this condition, the backrest can be displaced by the occupant by leaning backwardly and forwardly until the desired inclination is obtained. Thus, the backrest pivots about connections 24 and the racks are displaced forwardly or rearwardly via links 42. When the desired setting is reached the handle 37 is returned to its neutral position (as shown in FIG. 1) to remesh the pawls 46 and racks 44. The pawls 46 are spring-loaded to their locking positions, for example by spring 67 acting on the abutment pin 66 of the cam followers. The backrest itself is spring biased forward relative to the seat base to facilitate inclination adjustment thereof. According to an advantageous feature of the invention, this spring loading is obtained by a coil or torsion spring 68 having one tail 71 engaged with the seat cushion frame and its other tail 69 engaged with the lever arm 70 which is pivoted at 32 and has a pin and slot connection at its other end with the elongate member 34 and the link 42 so that the spring force acts on the link 42 and hence the backrest. This arrangement provides a mechanical advantage which allows the use of a weaker spring than is normally used to bias the backrest forwardly.

As well as allowing the inclination of the backrest to be varied, the construction described above also allows the backrest to be folded forwardly with accompanying movements of the seat. This is possible when the catch 22 is released because the link 26 is then free to pivot about point 32 and folding of the backrest can take place about the axes of pivot 24 and 32 even though the pawl 46 is in mesh with the rack 34. As the backrest is folded forwardly, forward movement is transmitted to the seat base via link 26. The arrangement of the rollers 18 is such that the seat base can be tilted upwardly at its rear end during forward movement. The parts can be restored to their original positions, as illustrated, by unfolding the backrest until the catches 22 re-engage with the keepers 28, at which time the links 26 are held against movement once more.

The ends of the spindle 61 are mounted rotatably at opposite sides of the base 10 and the central portion of the spindle is cranked with respect to its ends. The handle 37 is located at one side of the seat and the catches 22, which are angularly movable on respective end portions of the spindle 61, are spring biased by spring 74 in a clockwise direction towards their locking positions in which they can engage the keeper pins 28. Turning of the catches 22 counter-clockwise to release them is effected by displacing the handle 37 counter-clockwise or forwardly and this motion is transmitted to the catches 22 via coupling plates 76 which are rotatably fast with the spindle 61 and have a pin and slot coupling with the respective catches. In the illustrated embodiment, the slots 78 are provided in the plates 76 and are concentric with the turning axis of spindle 61 and the pins 80 are provided on the catches 22, the arrangement being such that the pins 80 are normally at one end of the slot 78 whereby catch release is effected without any lost motion.

Figure 2:
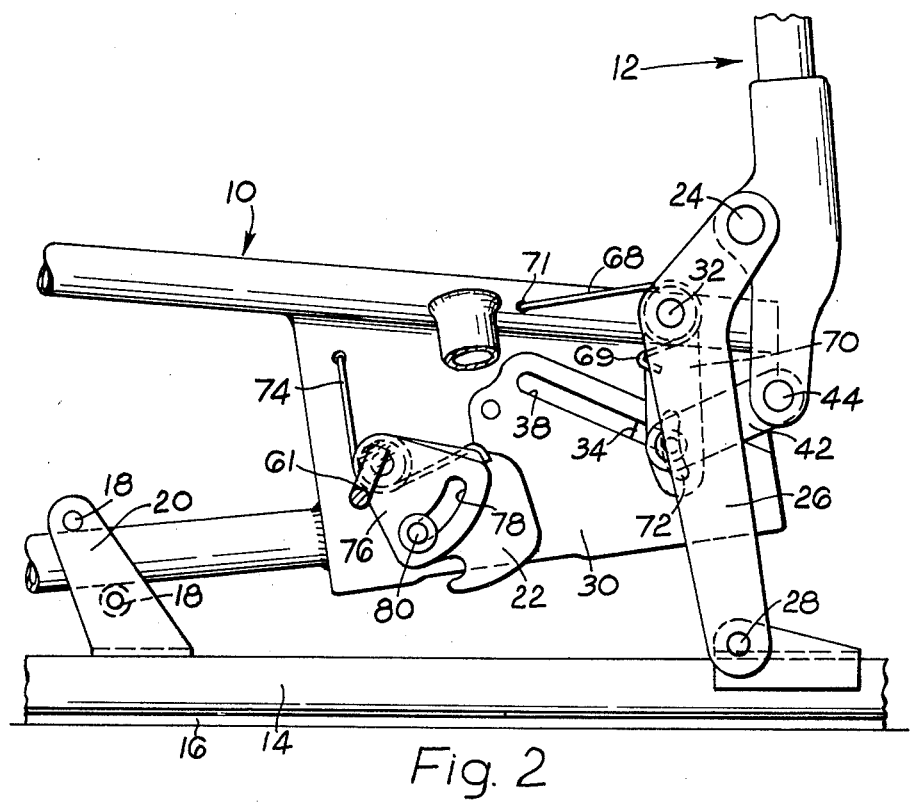
FIG. 2 is a similar side view to that of FIG. 1, but showing the backrest folded forwardly.
Figure 3:
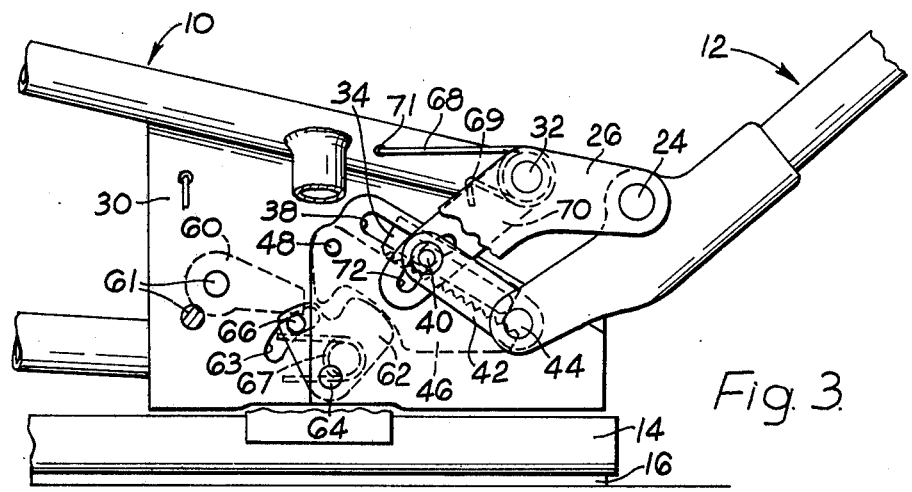
FIG. 3 is a side view similar to FIGS. 1 and 2 but with certain parts removed to illustrate more clearly the reclining mechanism of the seat.

When it is desired to fold the backrest forwardly to allow access to the backseats of a two-door vehicle, the catches 22 are released by forward displacement of the handle 37, thus freeing them from the keepers 28. As the backrest is folded forwardly, it pivots about connections 24 and creates forward movement of the seat base. The action of the linkage arrangement can be seen by comparing FIGS. 1 and 2. When the backrest is returned to the proper seating position, the seat base travels rearwardly and the pivot pins 28 ride beneath the respective catches, at which time the cathes relock. When the pins 28 are locked by catches 22, it will be understood that the arms 26 are effectively fixed in position and therefore the backrest is fixed in position by the links 42. A feature of the invention is that the catches 22 are displaceable independently from one another and spindle 61 and hence they do not necessarily re-engage with the pins 28 simultaneously. Consequently, if for some reason, one of the catches is not re-engaged properly, it does not prevent the other one from doing so.

It will be seen that folding of the backrest and forward movement of the seat base are coordinated by the link 26 and this action is possible regardless of the position of adjustment of the backrest as dictated by the pawl 46 and the rack 34. The amount of forward movement imparted to the seat base for a given angular movement of the backrest, during the folding action, is governed by the ratio of the distances between the pivots 24 and 32 and pivots 32 and 28 respectively. Thus, if the distance between the pivots 24, 32 is made larger, the seat base will move to a smaller forward distance and vice versa. If desired, the arrangement may be such that the seat base initially moves through a large distance for a given angle of fold during the initial part of the folding movement but progressively moves through smaller distances per unit angle as the backrest approaches the fully folded condition. In some cases, lost motion may be provided in such a way that the seat base can be arrested in a forward displaced position whilst allowing further forward folding of the backrest to take place without accompanying movement of the seat base. This lost motion could be provided at the point 32 by means of a pin and slot arrangement in place of the plain pivot, the pin being spring urged to one end of the slot but being allowed to travel along the slot with lost motion if the seat base encounters an obstacle during forward movement. This arrangement will be useful in cases where forward movement of the seat base is limited by, for example, an outward flare in the transmission torque adjacent the forward part of the passenger accommodation. Thus, when the seat base encounters the flared part of the transmission tunnel, the biasing action of the spring acting on the pin may be overcome so as to allow lost motion to occur and hence allow continued folding of the backrest to take place.

Various other modifications are possible within the scope of the invention; for instance, the link 42 may be replaced by a pin and slot type coupling between the rack 34 and the backrest, e.g. the rack 34 would be lengthened and would carry a pin engaging in a slot in the backrest which slot would extend generally perpendicularly to the rack. Also the pawl 46 need not be pivoted; instead it could be slidable perpendicularly relative to the rack with appropriate modification of the cam arrangement.

Having now described our invention what we claim is:

1. A vehicle seat comprising a seat base, a backrest and structure supporting the seat base for sliding movement forwardly and rearwardly, the backrest and seat base being coupled together at spaced pivotal connections by a link which is also pivotally coupled to the supporting structure below its said pivotal connections with the backrest and seat base, releasable locking means being provided to maintain said link in a fixed predetermined angular position, whereby, when said locking means is released, folding of the backrest relative to the seat base pivots said link about its pivotal connection with said supporting structure and thereby imparts sliding movement to the seat base, said vehicle seat including second releasable locking means for controlling the angular inclination or said backrest relative to the seat base, said second locking means comprising an elongate member mounted on the seat base, below the pivotal connections between the link and the seat base and backrest, for sliding displacement in its lengthwise direction and a locking element mounted on said seat base and operable to engage said elongate member and being connected to said backrest by coupling means which, when said locking element is inoperable, translates angular movement of the backrest about its pivotal connection with said link into said sliding displacement of the elongate member whereby the backrest can be pivoted to a desired angular setting and held at such setting by rendering said locking element operable.

2. A vehicle seat as claimed in claim 1 in which the elongate member is a toothed rack which is guided so as to slide rectilinearly on said seat base and the locking element comprises a toothed member movable into and out of mesh with the rack under the control of a lever operable cam.

3. A vehicle seat as claimed in claim 1 in which said coupling means comprises a second link coupling the elongate member to the backrest.

4. A vehicle seat as claimed in claim 1 in which the backrest is biased in one angular sense relative to the seat base by a spring which acts between the seat base and said elongate member.

5. A vehicle seat as claimed in claim 1 in which said support structure comprises parallel slideways for fixture to the vehicle floor and slides connected to the seat base and adjustably carried by said slideways, said link being pivotally connected to said slides.

6. A vehicle seat as claimed in claim 1 in which the releasable locking means comprises a pair of catches carried by the seat base at opposite sides thereof and spring-biased for engagement with respective keepers in a predetermined position of the seat base relative to said support structure, and an operating member which, when displaced from a neutral position in one angular sense, releases both catches from the keepers but when returned to said neutral position allows the catches to be spring-returned to their operative positions independently of each other.

7. A vehicle seat as claimed in claim 1 wherein the first-mentioned locking means comprises a pair of catches carried by the seat base at opposite sides thereof and spring-biased for engagement with respective keepers in a predetermined position of the seat base relative to said support structure, and an operating member which, when displaced from a neutral position in one angular sense, releases both catches from the keepers but when returned to said neutral position allows the catches to be spring-returned to their operative positions independently of each other and wherein the operating member has lost motion connections with said catches to enable the operating member to be displaced from said neutral position in the opposite angular sense without releasing said catches, the operating member being coupled to said second locking means whereby said locking element is moved to its inoperative position in response to displacement of the operating member in said opposite angular sense.

* * * * *